United States Patent
Seidman et al.

(10) Patent No.: US 8,612,573 B2
(45) Date of Patent: Dec. 17, 2013

(54) AUTOMATIC AND DYNAMIC DETECTION OF ANOMALOUS TRANSACTIONS

(75) Inventors: David Isaiah Seidman, Durham, NC (US); Jyoti Kumar Bansal, San Francisco, CA (US)

(73) Assignee: CA, Inc., Islandia, NY (US)

( * ) Notice: Subject to any disclaimer, the term of this patent is extended or adjusted under 35 U.S.C. 154(b) by 1155 days.

(21) Appl. No.: 12/200,784

(22) Filed: Aug. 28, 2008

(65) Prior Publication Data

US 2010/0058345 A1    Mar. 4, 2010

(51) Int. Cl.
*G06F 15/173*    (2006.01)

(52) U.S. Cl.
USPC .......................................... 709/224; 709/223

(58) Field of Classification Search
USPC .......................................................... 709/224
See application file for complete search history.

(56) References Cited

U.S. PATENT DOCUMENTS

| | | | |
|---|---|---|---|
| 5,475,813 A * | 12/1995 | Cieslak et al. ................. | 714/4.1 |
| 7,689,688 B2 * | 3/2010 | Iwamoto ........................ | 709/224 |
| 7,720,955 B1 * | 5/2010 | Kelly et al. ................... | 709/223 |
| 7,797,415 B2 * | 9/2010 | Peracha ......................... | 709/223 |
| 8,291,066 B2 * | 10/2012 | Melamed et al. .............. | 709/224 |
| 2004/0068560 A1 * | 4/2004 | Oulu et al. ..................... | 709/224 |
| 2005/0039172 A1 * | 2/2005 | Rees et al. ..................... | 717/130 |
| 2006/0010101 A1 * | 1/2006 | Suzuki et al. ..................... | 707/2 |
| 2006/0031466 A1 * | 2/2006 | Kovach .......................... | 709/224 |
| 2006/0156072 A1 * | 7/2006 | Khot et al. ....................... | 714/47 |
| 2008/0004720 A1 * | 1/2008 | Mckinney et al. ................ | 700/9 |
| 2008/0021994 A1 * | 1/2008 | Grelewicz et al. ............. | 709/224 |
| 2008/0034352 A1 * | 2/2008 | McKinney et al. ............. | 717/130 |
| 2008/0097801 A1 * | 4/2008 | MacLellan et al. ................ | 705/7 |
| 2008/0263548 A1 * | 10/2008 | Chagoly et al. ................ | 718/100 |
| 2008/0276227 A1 * | 11/2008 | Greifeneder .................... | 717/130 |
| 2009/0006615 A1 * | 1/2009 | De Pauw et al. ............... | 709/224 |

* cited by examiner

*Primary Examiner* — Richard G Keehn
(74) *Attorney, Agent, or Firm* — Vierra Magen Marcus LLP

(57) ABSTRACT

Anomalous transactions are identified and reported. Transactions are monitored from the server at which they are performed. A baseline is dynamically determined for transaction performance based on recent performance data for the transaction. The more recent performance data may be given a greater weight than less recent performance data. Anomalous transactions are then identified based on comparing the actual transaction performance to the baseline for the transaction. An agent installed on an application server performing the transaction receives monitoring data, determines baseline data, and identifies anomalous transactions. For each anomalous transaction, transaction performance data and other data is reported.

26 Claims, 11 Drawing Sheets

AUTOMATIC AND DYNAMIC DETECTION OF ANOMALOUS TRANSACTIONS

BACKGROUND

The growing presence of the Internet as well as other computer networks such as intranets and extranets has brought many new applications in e-commerce and other areas. Organizations increasingly rely on such applications to carry out their business or other objectives, and devote considerable resources to ensuring that the applications perform as expected. To this end, various application management techniques have been developed.

Application management techniques have included monitoring of applications. Some prior systems monitor transactions from a client which requests services provided by the application. Though monitoring an application from a client does not provide additional load for a server, it may not provide an accurate indication of the performance of the application or server. For example, when monitoring the length of a transaction from a client, it is difficult to determine whether transaction delays are due to the server processing the transaction or the network over which client-server communications are transmitted.

SUMMARY

The technology described herein pertains to dynamically identifying and reporting performance data for anomalous transactions. The present system monitors transactions from the server at which they are executed. Identifying anomalous transactions begins with monitoring transactions and generating actual performance data for the transactions. Baseline data for each transaction is dynamically determined. Note that the just monitored transactions are typically not included in the baseline data. After the baseline data is determined, the system identifies whether an anomaly has occurred for a given transaction based on a comparison of the actual performance data to the baseline data for the given transaction. For each transaction identified as an anomaly, the system reports transaction performance data and other transaction data.

In an embodiment, transactions are performed at a server in response to a request. The server transactions are monitored and performance data is generated for each transaction. An expected value for the performance of each transaction is dynamically determined. For each transaction that does not satisfy the corresponding expected value, transaction data is reported.

In an embodiment, each of a plurality of transactions is monitored. Each transaction is comprised of components and performed at a server in response to a request. Performance data is generated for each transaction. An expected value of the performance data is also calculated for each transaction from past performance data. The generated performance data is compared to the expected performance data for each transaction. Data for components of transactions is reported by the server based on the comparison.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

DETAILED DESCRIPTION

Figure 1:
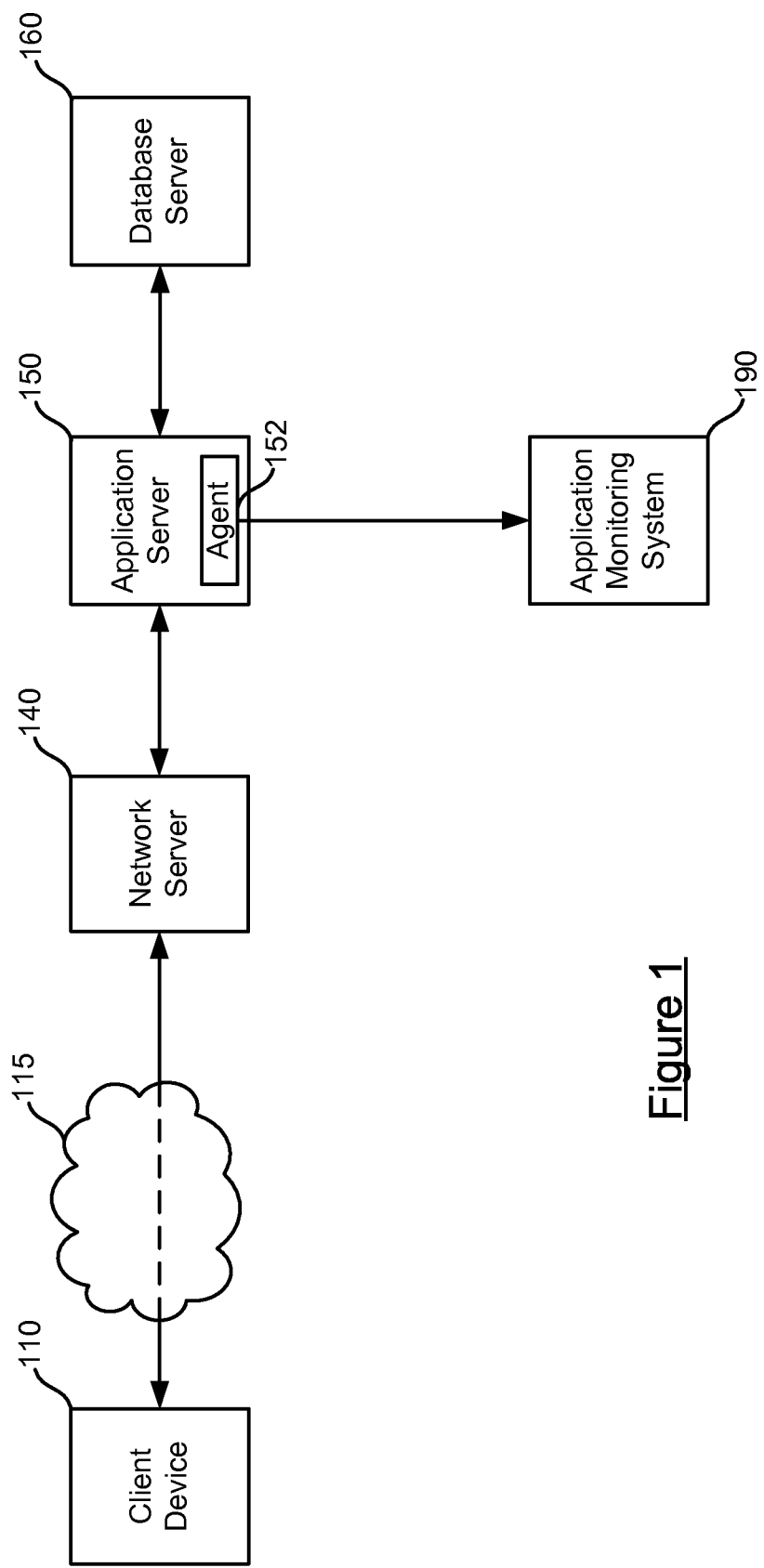
FIG. 1 is a block diagram of an embodiment of a network monitoring system which monitors a network service.

The present technology, roughly described, dynamically identifies anomalous transactions and reports performance data for such transactions. The system monitors transactions from the server at which they are executed. Identifying anomalous transactions begins with monitoring transactions and generating actual performance data for the transactions. Baseline data for each transaction is dynamically determined. Note that the just monitored transactions are typically not included in the baseline data. After the baseline data is determined, the system identifies whether an anomaly has occurred for a given transaction based on a comparison of the actual performance data to the baseline data for the given transaction. For each transaction identified as an anomaly, the system reports transaction performance data and other transaction data In some embodiments, the baseline is determined dynamically at the server. Once each transaction ends, the baseline is calculated based on performance data in which a higher weight is given to the more recent performance data than less recent performance data for that particular transaction. The baseline is not determined based on an average metric or consolidation of any sets of data. Dynamically calculating the baseline involves predicting the next expected value for each transaction instance based on giving more weight to most recent values for the transaction. Giving a higher weight to the most recent values of transaction performance for a particular transaction allows for more accurate performance predictions for each transaction.

Anomalous transactions are determined automatically by the present system. In some embodiments, an agent is installed on an application server or other machine which performs a transaction. The agent receives monitoring data from monitoring code within an application that performs the transaction and determines a baseline for the transaction. The actual transaction performance is then compared to expected values (the baseline value) for transaction performance for each transaction. The agent can identify anomalous transactions based on the comparison and configuration data received from an application monitoring system. After the agent identifies anomalous transactions, information for such transactions is automatically reported to a user. The reported information may include rich application transaction information, including the performance and structure of components that comprise the application, for each anomaly transaction.

Monitoring transactions can be difficult because of the resources and time required to process the large number of transactions performed by a typical web-service application. An application may perform hundreds or thousands of transactions per second. Most prior monitoring systems don't analyze each and every transaction because of the load on server resources and the burden for any users to analyze all the reported data. Because of the resource load and user time constraints, most monitoring systems process average metrics over a period of time.

Unlike systems that process an average metric, such as an average response time over some period of time, the present system may automatically analyze and report transaction performance data for individual transactions of interest. Automatically processing the transactions to report only those of interest reduces the user time requirements for analyzing transactions. Moreover, since only those transactions of interest are reported, the present system may report more detailed information for each reported transaction than merely an average metric reported by other systems.

FIG. 1 is a block diagram of an embodiment of a network monitoring system which monitors a network service. The network service includes an example network server 140 and an example application server 150. In practice, any number of servers or other computing devices which are connected in any configuration can be used. Network server 140 sends traffic to and receives traffic from an example client device 110 over a network 115, such as the Internet or other WAN, a LAN, intranet, extranet, private network or other network or networks. In practice, a number of client devices can communicate with the network server 140 over network 115.

Application server 150 may be in communication with network server 140. In particular, when network server 140 receives a request from client device 110, network server 140 may relay the request to application server 150 for processing. The client device 110 can be a laptop, PC, workstation, cell phone, PDA, or other computing device which is operated by an end user. Or, the client device can be an automated computing device such a server. Application server 150 processes the request received from network server 140 and sends a corresponding response to the client device 110 via the network server 140. In some embodiments, application server 150 may send a request to database server 160 as part of processing a request received from network server 140. Database server 160 may provide a database or some other backend service and process requests from application server 150

The network monitoring system also includes an application monitoring system 190. In some embodiments, the application monitoring system uses one or more agents, such as agent 152, which is considered part of the application monitoring system 190, though it is illustrated as a separate block in FIG. 1. Agent 152 and application monitoring system 190 monitor the execution of one or more applications at the application server 150, generate performance data, which represents the execution of components of the application responsive to the requests, and process the generated performance data. In some embodiments, application monitoring system 190 may be used to monitor the execution of an application or other code at some other server, such as network server 140 or backend database server 160.

Figure 2A:
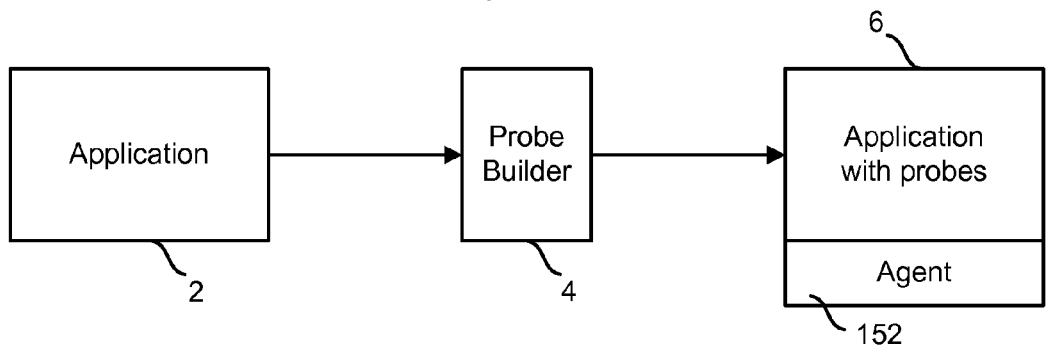
FIG. 2A is a block diagram describing how bytecode for an application is instrumented.

In one embodiment, the technology herein generates a time series of application performance data by monitoring an application on an application server via bytecode instrumentation. The technology herein may also be used to access information from the particular application. To generate the time series, an application management tool may instrument the application's object code (also called bytecode). FIG. 2A depicts an exemplar process for modifying an application's bytecode. FIG. 2A shows Application 2, Probe Builder 4, Application 6 and Agent 152. Application 6 includes probes used to access information from the application, and application 2 is the application before the probes are added. Application 2 can be a Java application or a different type of application.

Probe Builder 4 instruments (e.g. modifies) the bytecode for Application 2 to add probes and additional code to Application 2 in order to create Application 6. The probes may measure specific pieces of information about the application without changing the application's business logic. Probe Builder 4 may also generate one or more Agents 8. Agent 152 may be installed on the same machine as Application 6 or a separate machine. Once the probes have been installed in the application bytecode, the application is referred to as a managed application. More information about instrumenting byte code can be found in U.S. Pat. No. 6,260,187 "System For Modifying Object Oriented Code" by Lewis K. Cirne, incorporated herein by reference in its entirety.

One embodiment of the present invention instruments bytecode by adding new code. The added code activates a tracing mechanism when a method starts and terminates the tracing mechanism when the method completes. To better explain this concept, consider the following example pseudo code for a method called "exampleMethod." This method receives an integer parameter, adds 1 to the integer parameter, and returns the sum:

```
public int
   exampleMethod(int x)
   {
   return x + 1;
   }
```

In some embodiments, the present system will instrument the existing code, conceptually, by including a call to a tracer method, grouping the original instructions from the method in a "try" block and adding a "finally" block with a code that stops the tracer. An example is below which uses the pseudo code for the method above.

```
public int
   exampleMethod(int x)
   {
   IMethodTracer tracer = AMethodTracer.loadTracer(
      "com.introscope.agenttrace.MethodTimer",
      this,
      "com.wily.example.ExampleApp",
      "exampleMethod",
      "name=Example Stat");
   try {
   return x + 1;
   } finally {
      tracer.finishTrace( );
      }
   }
```

IMethodTracer is an interface that defines a tracer for profiling. AMethodTracer is an abstract class that implements IMethodTracer. IMethodTracer includes the methods startTrace and finishTrace. AMethodTracer includes the methods startTrace, finishTrace, dostartTrace and dofinishTrace. The method startTrace is called to start a tracer, perform error handling and perform setup for starting the tracer. The actual tracer is started by the method doStartTrace, which is called by startTrace. The method finishTrace is called to stop the tracer and perform error handling. The method finishTrace calls doFinishTrace to actually stop the tracer. Within AMethodTracer, startTrace and finishTracer are final and void methods; and doStartTrace and doFinishTrace are protected, abstract and void methods. Thus, the methods doStartTrace and do FinishTrace must be implemented in subclasses of AMethodTracer. Each of the subclasses of AMethodTracer implement the actual tracers. The method loadTracer is a static method that calls startTrace and includes five parameters. The first parameter, "com.introscope . . . " is the name of the class that is intended to be instantiated that implements the tracer (e.g. discussed below—see FIGS. 4 and 5). The second parameter, "this" is the object being traced. The third parameter "com.wily.example . . . " is the name of the class that the current instruction is inside of. The fourth parameter, "exampleMethod" is the name of the method the current instruction is inside of. The fifth parameter, "name= . . . " is the name to record the statistics under. The original instruction (return x+1) is placed inside a "try" block. The code for stopping the tracer (a call to the static method tracer.finishTrace) is put within the finally block.

The above example shows source code being instrumented. In some embodiments, the present technology doesn't actually modify source code. Rather, the present invention modifies object code. The source code examples above are used for illustration to explain the concept of the present invention. The object code is modified conceptually in the same manner that source code modifications are explained above. That is, the object code is modified to add the functionality of the "try" block and "finally" block. More information about such object code modification can be found in U.S. patent application Ser. No. 09/795,901, "Adding Functionality To Existing Code At Exits," filed on Feb. 28, 2001, incorporated herein by reference in its entirety. In another embodiment, the source code can be modified as explained above.

Figure 2B:
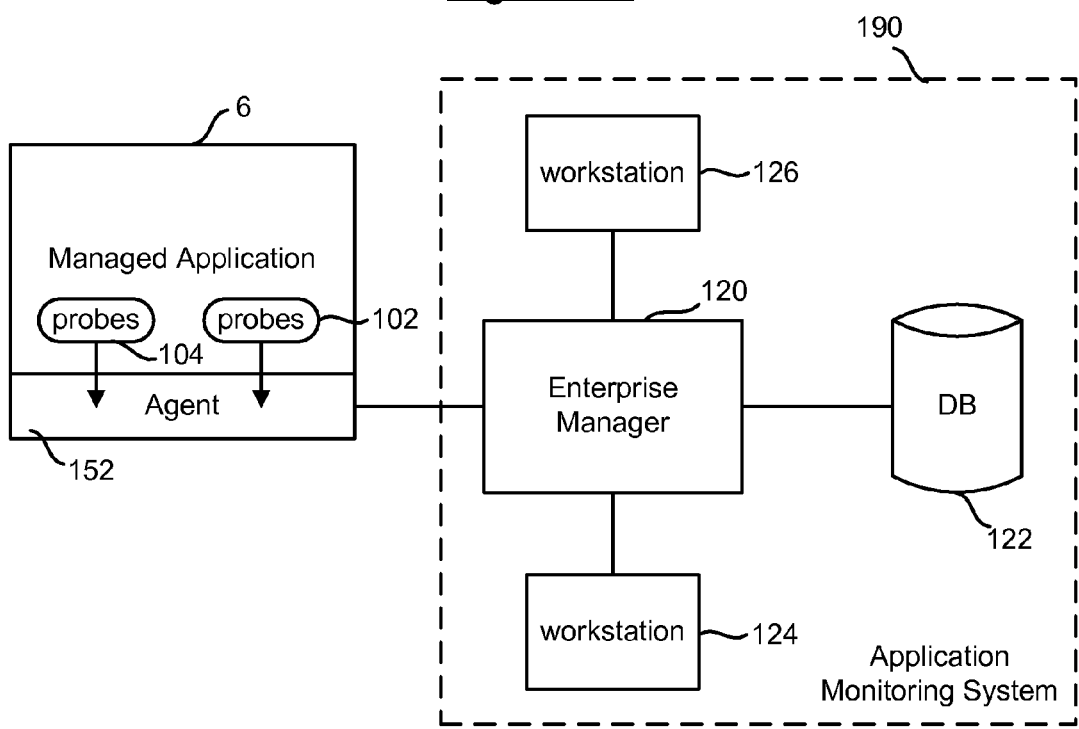
FIG. 2B is a block diagram of a system for monitoring an application.

FIG. 2B is a conceptual view of the components of an application performance management system. In addition to managed Application 6 with probes 102 and 104, FIG. 2B also depicts application monitoring system 160 comprising Enterprise Manager 120, database 122, workstation 124 and workstation 126. As a managed application runs, probes (e.g. 102 and/or 104) relay data to Agent 152. Agent 152 collects the received data, processes and optionally summarizes the data, and sends it to Enterprise Manager 120. Enterprise Manager 120 receives performance data from managed applications via Agent 152, runs requested calculations, makes performance data available to workstations (e.g. 124 and 126) and optionally sends performance data to database 122 for later analysis. The workstations (e.g. 124 and 126) are the graphical user interface for viewing performance data. The workstations are used to create custom views of performance data which can be monitored by a human operator. In one embodiment, the workstations consist of two main windows: a console and an explorer. The console displays performance data in a set of customizable views. The explorer depicts alerts and calculators that filter performance data so that the data can be viewed in a meaningful way. The elements of the workstation that organize, manipulate, filter and display performance data include actions, alerts, calculators, dashboards, persistent collections, metric groupings, comparisons, smart triggers and SNMP collections.

In one embodiment of the system of FIG. 2B, each of the components are running on different machines. That is, workstation 126 is on a first computing device, workstation 124 is on a second computing device, Enterprise Manager 120 is on a third computing device, and managed Application 6 is running on a fourth computing device. In another embodiment, two or more (or all) of the components are operating on the same computing device. For example, managed application 6 and Agent 152 may be on a first computing device, Enterprise Manager 120 on a second computing device and a workstation on a third computing device. Alternatively, all of the components of Figure two can run on the same computing device. Any or all of these computing devices can be any of various different types of computing devices, including personal computers, minicomputers, mainframes, servers, handheld computing devices, mobile computing devices, etc. Typically, these computing devices will include one or more processors in communication with one or more processor readable storage devices, communication interfaces, peripheral devices, etc. Examples of the storage devices include RAM, ROM, hard disk drives, floppy disk drives, CD ROMS, DVDs, flash memory, etc. Examples of peripherals include printers, monitors, keyboards, pointing devices, etc. Examples of communication interfaces include network cards, modems, wireless transmitters/receivers, etc. The system running the managed application can include a web server/application server. The system running the managed application may also be part of a network, including a LAN, a WAN, the Internet, etc. In some embodiments, all or part of the invention is implemented in software that is stored on one or more processor readable storage devices and is used to program one or more processors.

In some embodiments, a user of the system in FIG. 2B can initiate transaction tracing and baseline determination on all or some of the Agents managed by an Enterprise Manager by specifying trace configuration data. Trace configuration data may specify how traced data is compared to baseline data, for example by specifying a range or sensitivity of the baseline, type of function to fit to past performance data, and other data. All transactions inside an Agent whose execution time does not satisfy or comply with a baseline or expected value will be traced and reported to the Enterprise Manager 120, which will route the information to the appropriate workstations. The workstations have registered interest in the trace information and will present a GUI that lists all transactions that didn't satisfy the baseline, or were detected to be an anomalous transaction. For each listed transaction, a visualization that enables a user to immediately understand where time was being spent in the traced transaction can be provided.

Figure 2C:
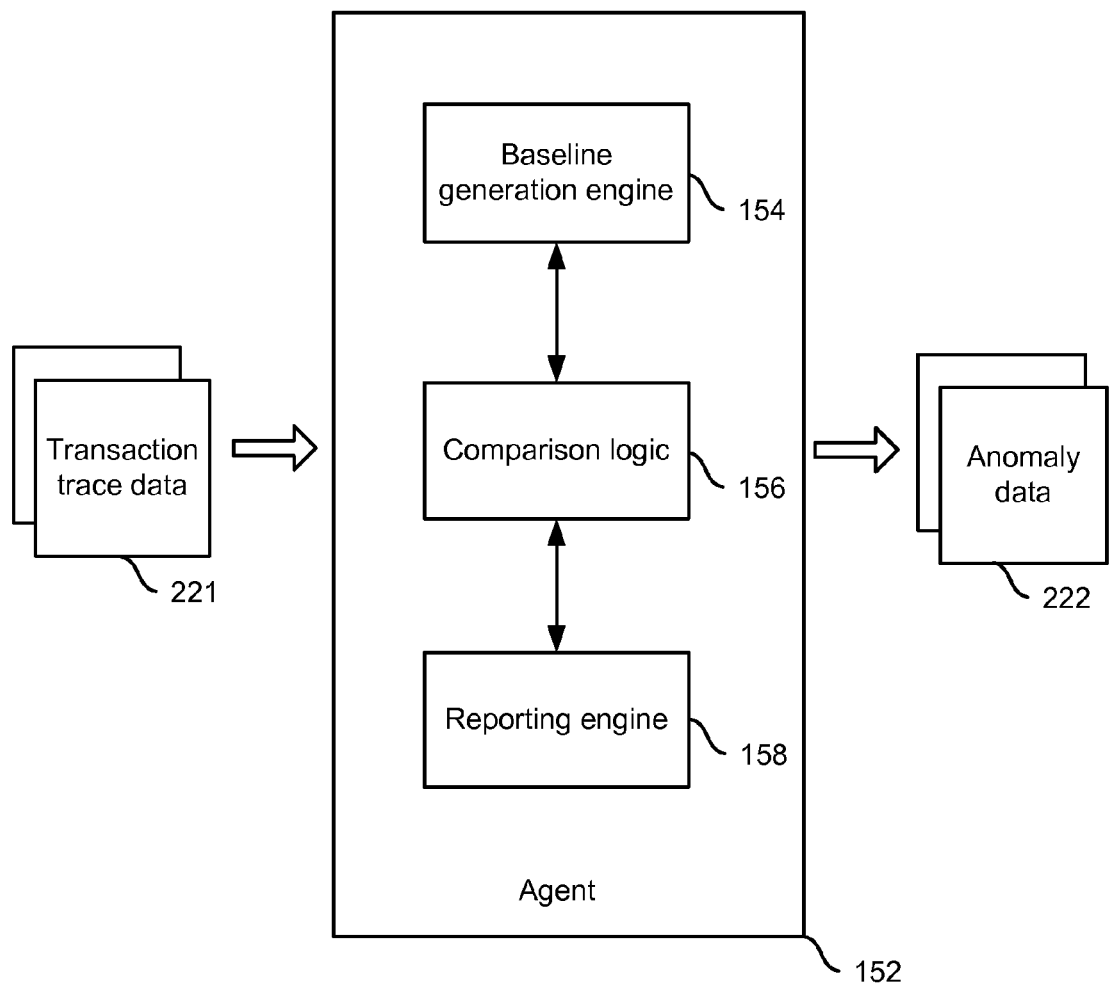
FIG. 2C is a block diagram of a logical representation of a portion of an agent.

FIG. 2C is a block diagram of a logical representation of a portion of an agent. Agent 152 includes comparison system logic 156, baseline generation engine 154, and reporting engine 158. Baseline generation engine 154 runs statistical models to process the time series of application performance data. For example, to generate a predicated data point, baseline generation engine 154 accesses time series data for a transaction and processes instructions to generate a baseline for the transaction. The time series data is contained in transaction trace data 221 provided to agent 152 by trace code inserted in an application. Baseline generation engine 154 will then generate the predicted data point and provide the point to Comparison system logic 156. Baseline generation engine 154 may also process instructions to fit a time series to a function, update a function based on most recent data points, and other functions. In some embodiments, baseline generation engine 154 may perform the method of FIG. 8.

Comparison system logic 156 includes logic that compares expected data to baseline data. In particular, comparison system logic 156 includes logic that carries out the process of FIG. 9 discussed below. Reporting engine 158 may identify flagged transactions, generate a report package, and transmit a report package having data for each flagged transaction. The report package provided by reporting engine 158 may include anomaly data 222.

Figure 3:
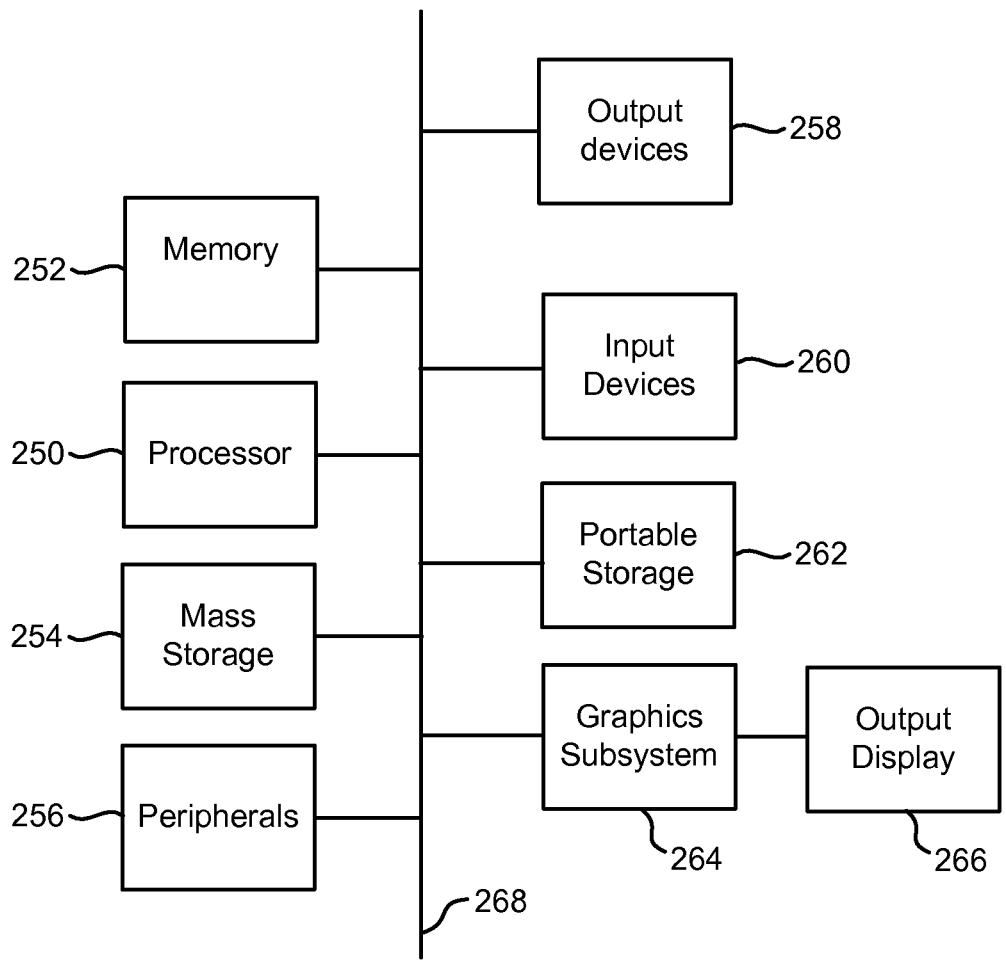
FIG. 3 illustrates an embodiment of a system for implementing the present technology.

FIG. 3 illustrates an embodiment of a computing system 200 for implementing the present technology. In one embodiment, the system of FIG. 3 may implement Enterprise manager 120, database 122, and workstations 124-126, as well client 110, network server 140, application server 150, and database server 160.

The computer system of FIG. 3 includes one or more processors 250 and main memory 252. Main memory 252 stores, in part, instructions and data for execution by processor unit 250. If the system of the present invention is wholly or partially implemented in software, main memory 252 can store the executable code when in operation. The system of FIG. 3 further includes a mass storage device 254, peripheral device(s) 256, user input device(s) 260, output devices 258, portable storage medium drive(s) 262, a graphics subsystem 264 and an output display 266. For purposes of simplicity, the components shown in FIG. 3 are depicted as being connected via a single bus 268. However, the components may be connected through one or more data transport means. For example, processor unit 250 and main memory 252 may be connected via a local microprocessor bus, and the mass storage device 254, peripheral device(s) 256, portable storage medium drive(s) 262, and graphics subsystem 64 may be connected via one or more input/output (I/O) buses. Mass storage device 254, which may be implemented with a magnetic disk drive or an optical disk drive, is a non-volatile storage device for storing data and instructions for use by processor unit 250. In one embodiment, mass storage device 254 stores the system software for implementing the present invention for purposes of loading to main memory 252.

Portable storage medium drive 262 operates in conjunction with a portable non-volatile storage medium, such as a floppy disk, to input and output data and code to and from the computer system of FIG. 3. In one embodiment, the system software for implementing the present invention is stored on such a portable medium, and is input to the computer system via the portable storage medium drive 262. Peripheral device (s) 256 may include any type of computer support device, such as an input/output (I/O) interface, to add additional functionality to the computer system. For example, peripheral device(s) 256 may include a network interface for connecting the computer system to a network, a modem, a router, etc.

User input device(s) 260 provides a portion of a user interface. User input device(s) 260 may include an alpha-numeric keypad for inputting alpha-numeric and other information, or a pointing device, such as a mouse, a trackball, stylus, or cursor direction keys. In order to display textual and graphical information, the computer system of FIG. 3 includes graphics subsystem 264 and output display 266. Output display 266 may include a cathode ray tube (CRT) display, liquid crystal display (LCD) or other suitable display device. Graphics subsystem 264 receives textual and graphical information, and processes the information for output to display 266. Additionally, the system of FIG. 3 includes output devices 258. Examples of suitable output devices include speakers, printers, network interfaces, monitors, etc.

The components contained in the computer system of FIG. 3 are those typically found in computer systems suitable for use with the present invention, and are intended to represent a broad category of such computer components that are well known in the art. Thus, the computer system of FIG. 3 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

Figure 4:
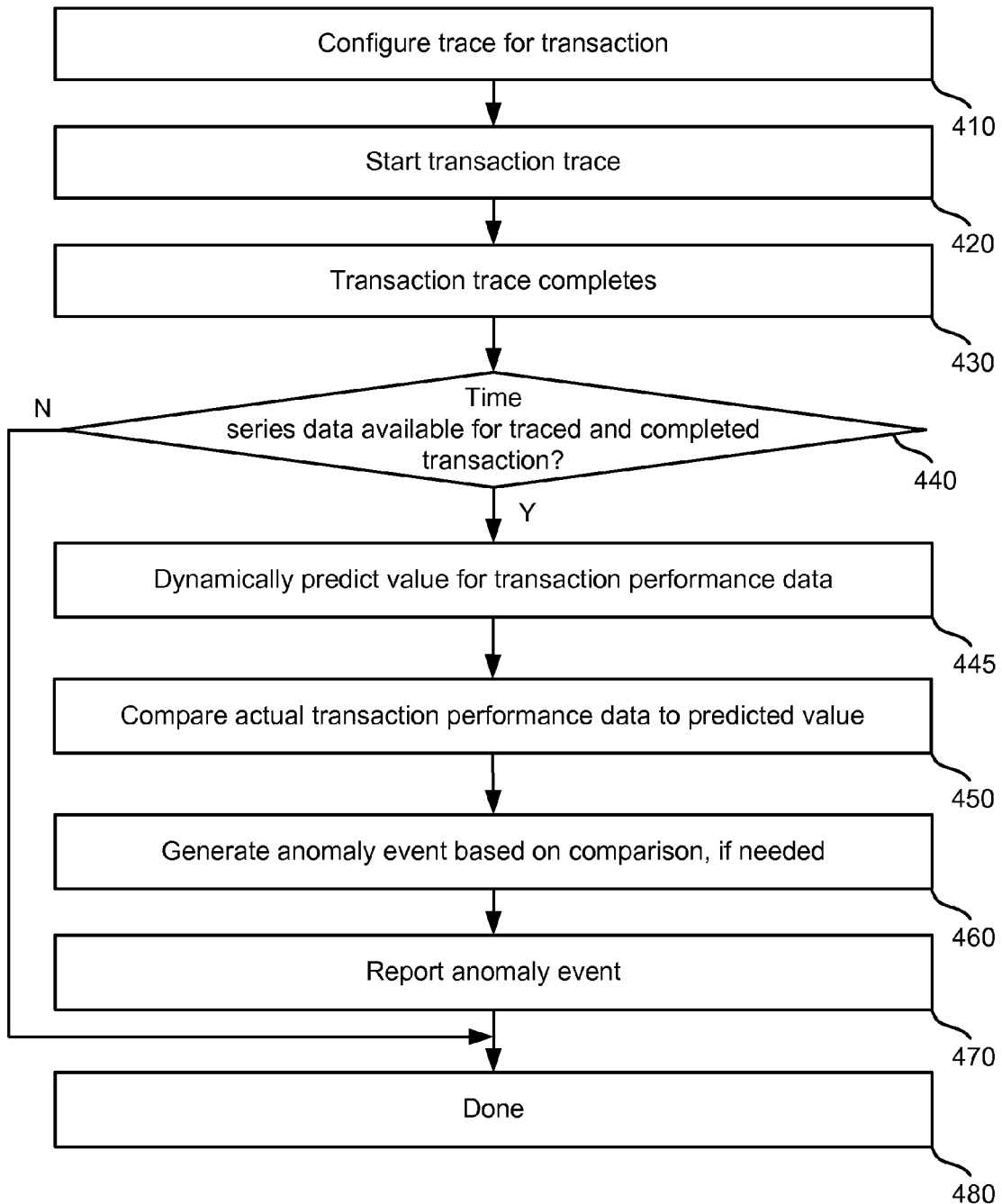
FIG. 4 illustrates a flow chart of an embodiment of a method for dynamically and automatically detecting anomalous transactions.

FIG. 4 illustrates a flow chart of an embodiment of a method for dynamically and automatically detecting anomalous transactions. In one embodiment, the system of FIG. 4 describes the operation of application monitoring system 190 and agent 152 when dynamically and automatically detecting anomalous transactions.

First, a trace is configured for one or more transactions at step 410. Configuring a trace may be performed at a workstation within application monitoring system 190. Trace configuration may involve identifying one or more transactions to monitor, one or more components within an application to monitor, selecting a sensitivity parameter for a baseline to apply to transaction performance data, and other information. Eventually, the configuration data is transmitted to an agent 152 within an application server by application monitoring system 190. Configuring a trace for a transaction is discussed in more detail below with respect to FIG. 5.

After configuring a trace, a transaction trace starts at step 420. In some embodiments, when a transaction to be monitored begins, the transaction trace is triggered by code inserted in the application. This is discussed in more detail below with respect to FIG. 6. The transaction trace then completes at step 430. Typically, completion of a transaction trace corresponds to the end of the transaction. Completing a transaction trace is discussed in more detail below with respect to FIG. 7.

A determination is made as to whether time series data is available for a traced and completed transaction at step 440. The determination at step 440 identifies whether there is past performance data for the transaction in order to determine a baseline for the transaction. For example, if the particular transaction that has been traced has not been performed previously, there may be no time series of data available. In some embodiments, if a particular traced transaction is not performed in the near past, time series data may not be available depending upon the statistical method used to determine the baseline, such as for example using moving window average method. If time series data is not available for the traced and completed transaction, the method at FIG. 4 ends at step 480. If time series data is available, a value for the performance transaction data is dynamically predicted at step 445. Dynamically predicting the transaction performance data may involve fitting a function to the past time series data which is available for that transaction. The fitted function may then be used to determine a baseline for the particular transaction and determine an expected value for the transaction. Dynamically predicting a value for transaction performance data is discussed in more detail below with respect to FIG. 8.

Actual transaction performance data is compared to a predicted value at step 450. At this step, performance data is generated from information received from the transaction trace and compared to the dynamically predicted value determined at step 445. Comparing the actual transaction performance data to a predicted value for the performance data is discussed in more detail below with respect to FIG. 9.

After comparing the data, an anomaly event may be generated based on the comparison if needed at step 460. Thus, if the comparison of the actual performance data and predicted performance data indicates that transaction performance was an anomaly, an anomaly event may be generated. In some embodiments, generating an anomaly event includes setting a flag for the particular transaction. Thus, if the actual performance of a transaction was slower or faster than expected within a particular range, a flag may be set which identified the transaction instance. The flag for the transaction may be set by comparison logic 156 within agent 152.

Anomaly events may be reported at step 470. In some embodiments, anomaly events are reported based on a triggering event, such as the expiration of an internal timer, a request received from enterprise manager 120 or some other system, or some other event. Reporting may include generating a package of data and transmitting the data to Enterprise Manager 120. Reporting an anomaly event is discussed in more detail below with respect to FIG. 10. After reporting the anomaly event, the method of FIG. 4 ends at step 480.

Figure 5:
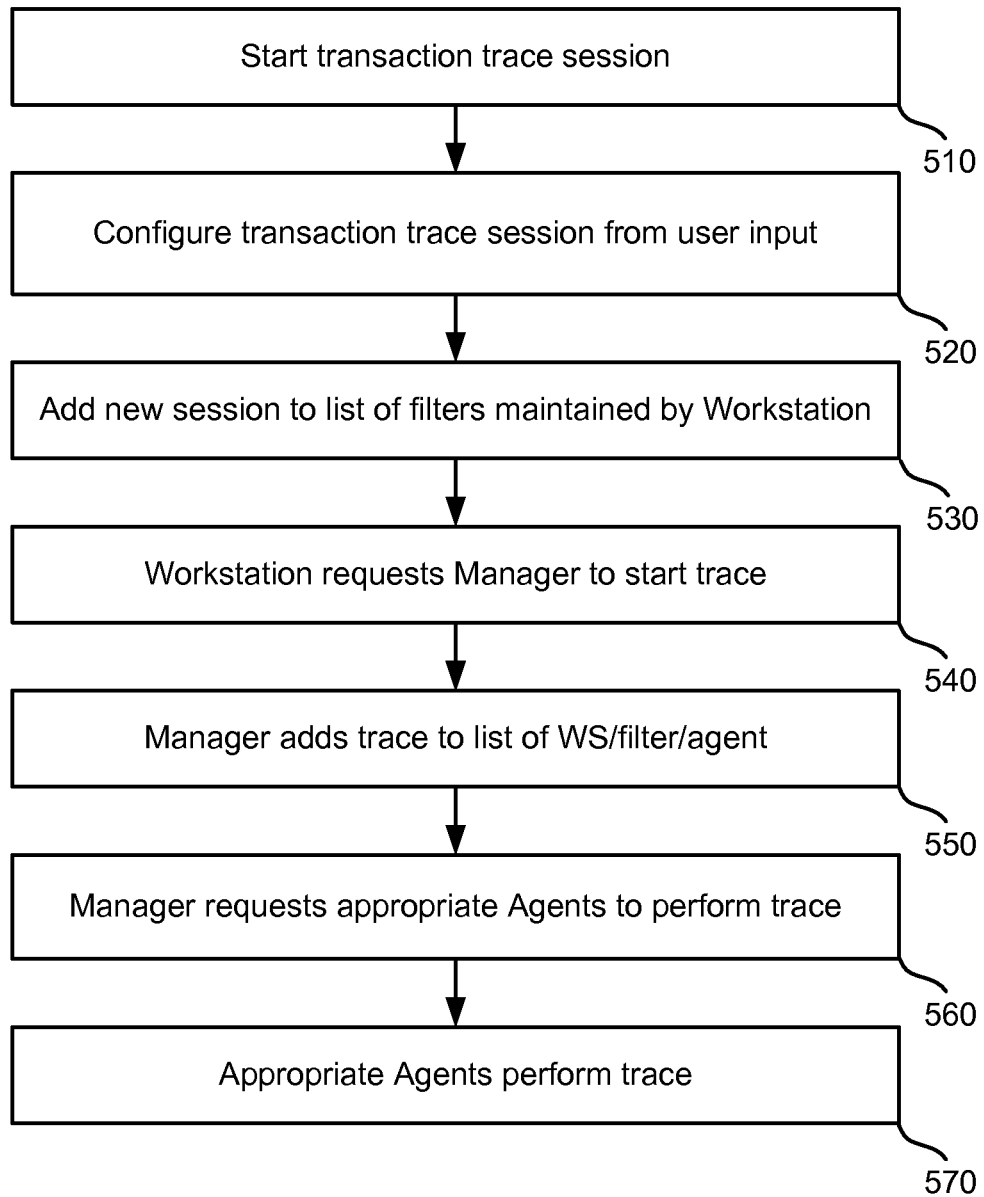
FIG. 5 is a flow chart of an embodiment of a method for configuring transaction tracing.

FIG. 5 is a flowchart of an embodiment of a method for configuring transaction tracing. In some embodiments, transaction tracing may be started at a server or other machine that is in communication with the server application to be monitored. For example, transaction tracing configuration may be performed at one of work stations 126 and 124 for tracing to be performed on application server 150.

First, a transaction trace session is started at step 510. In one embodiment, a window in a display provided at a workstation is opened and a user can select a dropdown menu to start the transaction trace session. In other embodiments, other methods can be used to start the session.

The transaction trace session is configured from user input at step 520. In some embodiments, a dialog box or other interface is presented to the user. This dialog box or interface will prompt the user for transaction trace configuration information. The configuration information is received from the user through a dialogue box or other interface element. Other means for entering the information can also be used within the spirit of the present invention.

Several configuration parameters may be received from or configured by a user, including a baseline sensitivity, identification or criteria for selecting functions to fit to past performance data, and other data. A user may enter a sensitivity or range parameter time, which could be in seconds, milliseconds, microseconds, etc. When analyzing transactions for response time, the system will only report those transactions that have an execution time that does not satisfy the range or sensitivity with respect to a predicted baseline value. For example, if the sensitivity is one second and the detected baseline is three seconds, the system will only report transactions that are executing for shorter than two seconds or longer than four seconds, which are outside the range of the baseline plus or minus the sensitivity.

In some embodiments, other configuration data can also be provided. For example, the user can identify an Agent, a set of Agents, or all Agents, and only identified Agents will perform the transaction tracing described herein. In some embodiments, Enterprise Manager 120 will determine which Agents to use. Another configuration variable that can be provided is the session length. The session length indicates how long the system will perform the tracing. For example, if the session length is ten minutes, the system will only trace transactions for ten minutes. At the end of the ten minute period, new transactions that are started will not be traced; however, transactions that have already started during the ten minute period will continue to be traced. In other embodiments, at the end of the session length all tracing will cease regardless of when the transaction started. Other configuration data can also include specifying one or more userIDs, a flag set by an external process or other data of interest to the user. For example, the userID is used to specify that the only transactions initiated by processes associated with a particular one, or more userIDs will be traced. The flag is used so that an external process can set a flag for certain transactions, and only those transactions that have the flag set will be traced. Other parameters can also be used to identify which transactions to trace.

The configured session data is added to a list of filters maintained by the particular workstation at step 530. After adding the new session to the filter list, the corresponding workstation sends a request to Enterprise Manager 120 to start the trace based on the new session configuration at step 540. Making the request includes transmitting the session configuration data by the workstation to Enterprise Manager 120.

Enterprise Manager 120 adds the received filter to a list of filters at step 550. For each filter in its list, Enterprise Manager 120 stores an identification of the workstation that requested the filter, the details of the filter (session parameters described above), and the Agents the filter applies to. In one embodiment, if the workstation does not specify which Agents the filter applies to, then the filter will apply to all Agents.

Enterprise Manager 120 communicates with one or more Agents 152 to perform the trace as configured in the session at step 560. Each agent performing the trace may receive instructions from Enterprise Manager 120 regarding one or more of what transaction to monitor, baseline information for determining predicted performance data ranges, and information regarding when to report anomaly data. The appropriate Agents receive the instructions and perform the trace at step 570.

When performing a trace of a transaction, one or more Agents 152 perform transaction tracing using Blame technology. Blame Technology works in a managed Java Application to enable the identification of component interactions and component resource usage. Blame Technology tracks components that are specified to it using concepts of consumers and resources. A consumer requests an activity while a resource performs the activity. A component can be both a consumer and a resource, depending on the context in how it is used.

An exemplary hierarchy of transaction components is now discussed. An Agent may build a hierarchical tree of transaction components from information received from trace code within the application performing the transaction. When reporting about transactions, the word Called designates a resource. This resource is a resource (or a sub-resource) of the parent component, which is the consumer. For example, under the consumer Servlet A (see below), there may be a sub-resource Called EJB. Consumers and resources can be reported in a tree-like manner. Data for a transaction can also be stored according to the tree. For example, if a Servlet (e.g. Servlet A) is a consumer of a network socket (e.g. Socket C) and is also a consumer of an EJB (e.g. EJB B), which is a consumer of a JDBC (e.g. JDBC D), the tree might look something like the following:

```
Servlet A
    Data for Servlet A
    Called EJB B
```

-continued

```
        Data for EJB B
          Called JDBC D
            Data for JDBC D
          Called Socket C
            Data for Socket C
```

In one embodiment, the above tree is stored by the Agent in a stack called the Blame Stack. When transactions are started, they are added to or "pushed onto" the stack. When transactions are completed, they are removed or "popped off" the stack. In some embodiments, each transaction on the stack has the following information stored: type of transaction, a name used by the system for that transaction, a hash map of parameters, a timestamp for when the transaction was pushed onto the stack, and sub-elements. Sub-elements are Blame Stack entries for other components (e.g. methods, process, procedure, function, thread, set of instructions, etc.) that are started from within the transaction of interest. Using the tree as an example above, the Blame Stack entry for Servlet A would have two sub-elements. The first sub-element would be an entry for EJB B and the second sub-element would be an entry for Socket Space C. Even though a sub-element is part of an entry for a particular transaction, the sub-element will also have its own Blame Stack entry. As the tree above notes, EJB B is a sub-element of Servlet A and also has its own entry. The top (or initial) entry (e.g., Servlet A) for a transaction is called the root component. Each of the entries on the stack is an object. While the embodiment described herein includes the use of Blame technology and a stack, other embodiments of the present invention can use different types of stack, different types of data structures, or other means for storing information about transactions.

Figure 6:
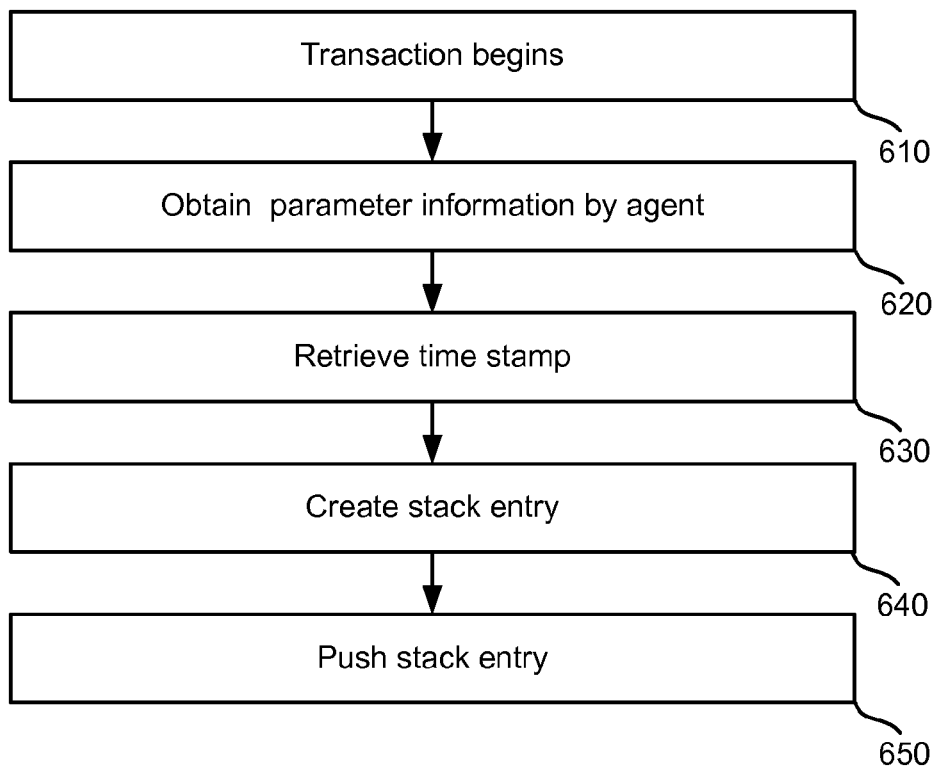
FIG. 6 is a flow chart describing one embodiment of a method for starting transaction tracing.

FIG. 6 is a flow chart describing one embodiment of a method for starting transaction tracing. The method of FIG. 6 may be performed by one or more agents configured to perform a configured trace of one or more transactions. In step 610, a transaction starts. The transaction may be started in response to a request or other invocation event for the application. When the transaction starts, the tracing of the transaction begins as well. In one embodiment, the tracing process is triggered by the start of a method as described above (for example, the calling of the "loadTracer" method).

Parameter information is obtained by the agent at step 620. In one embodiment, a user can configure which parameter information is to be acquired via a configuration file or a GUI provided by a workstation as discussed above. The acquired parameters are stored in a hash map, which is part of the object pushed onto the Blame Stack. In other embodiments, the identification of parameters is pre-configured. Several different parameters can be stored, and the particular parameters obtained is not intended to be limited. In some embodiments, the actual list of parameters used is dependent on the application being monitored. Some parameters that may be obtained and stored include UserID, URL, URL Query, Dynamic SQL, method, object, class name, and others. These are other parameters are listed in patent application Ser. No. 10/318,272, entitled "Transaction Tracer," filed on Dec. 12, 2002, and having inventors Lewis Cirne and Daryl Puryear which is hereby incorporated in reference in its entirety.

A timestamp is retrieved or acquired at step 630. The time stamp indicates the time at which the transaction or particular component was pushed onto the stack. After retrieving the time stamp, a stack entry is created at step 640. In some embodiments, the stack entry is created to include the parameter information discussed above with respect to step 620 as well as the time stamp retrieved at step 630. The stack entry is then added or "pushed onto" the Blame Stack at step 650. Once the transaction completes, a process similar to that of FIG. 5 is performed when a sub-component of the transaction starts (for example, EJB B is a sub-component of Servlet A—see tree described above). As a result, a stack entry is created and pushed onto the stack as each component begins. As each component and eventually the entire transaction ends, each stack entry is removed from the stack. The resulting trace information can then be assembled for the entire transaction with component level detail. Removing an entry from the stack is discussed in more detail below with respect to FIG. 7.

Figure 7:
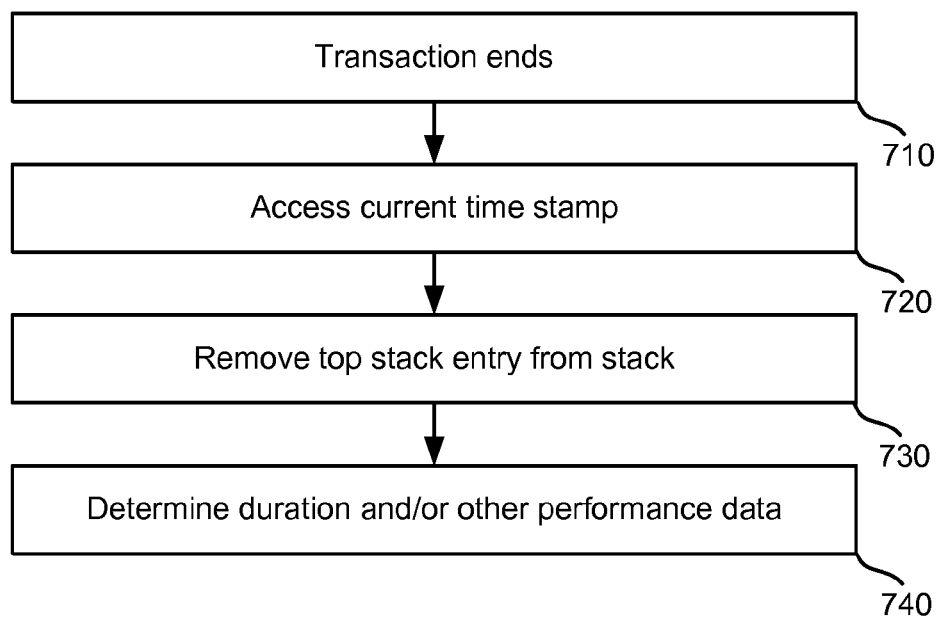
FIG. 7 is a flow chart describing one embodiment of a method for stopping transaction tracing.

FIG. 7 is a flow chart describing one embodiment of a method for stopping transaction tracing. The method of FIG. 7 provides more detail for step 430 of the method of FIG. 4 and is performed by an Agent 152 when a monitored transaction ends. First, the transaction being monitored ends at step 710. When the transaction ends, the process of ending the trace of a transaction is triggered by calling the method "finishTrace" as discussed above. A current time stamp is then accessed or retrieved at step 720.

After retrieving the current time stamp, the top stack entry from the stack (Blame Stack) is removed at step 730. The top entry should correspond to the most recently executed component of the transaction, or the transaction itself (the root component) if all other components have completed. The execution time of the transaction is then calculated by comparing the timestamp from step 720 to the timestamp stored in the removed stack entry (created at step 640 in the method of FIG. 6). In some embodiments, the duration of the transaction is considered a portion of the performance data associated with the transaction. Other performance data may include duration of each component of the transaction, whether the transaction stalled, ended in error, and other data. Once the duration or execution time has been determined, a determination can be made as to whether the transaction has satisfied the expected performance range or should be considered an anomaly. Analyzing the performance of a transaction is discussed in more detail below with respect to FIG. 8.

FIG. 7 was discussed in the context of what happens when a transaction finishes. When a sub-component of a transaction finishes, such as for example an EJB component process within a transaction, the steps performed include getting a time stamp, removing the stack entry for the sub-component and adding the completed sub-element to the previous stack entry. In some embodiments, any filters and decision logic are applied to the start and end of the transaction, rather than to a specific sub-component.

Figure 8:
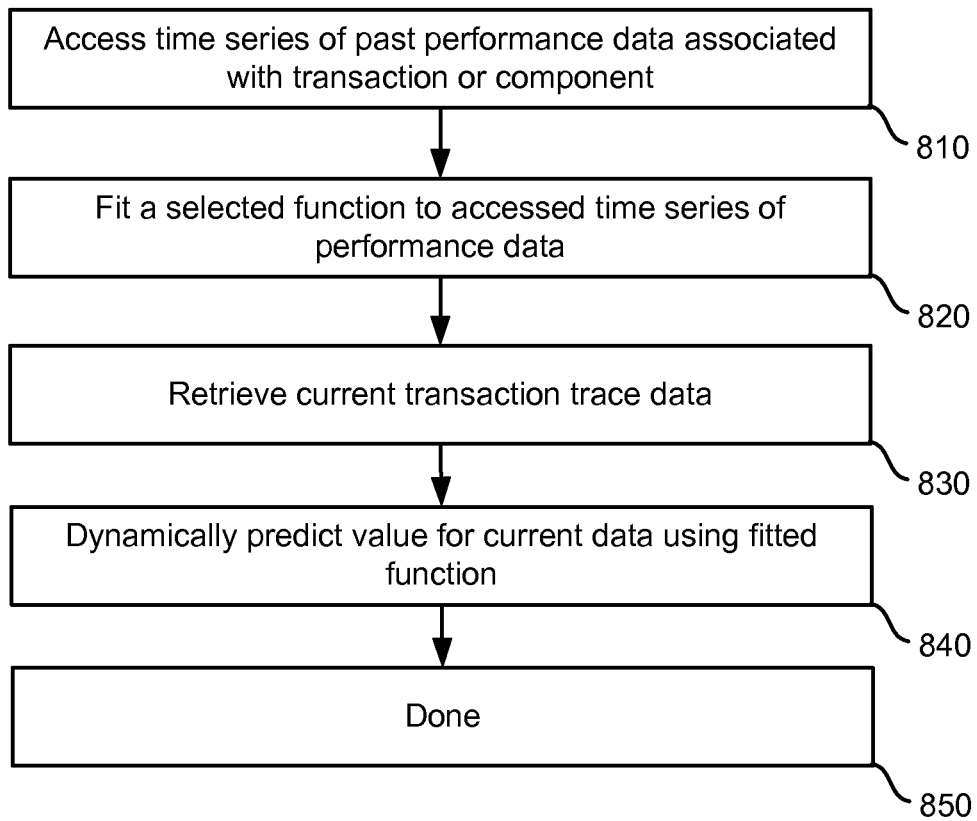
FIG. 8 illustrates a flowchart of an embodiment of a method for dynamically predicting a value for transaction performance data.

FIG. 8 illustrates a flowchart of an embodiment of a method for dynamically predicting a value for transaction performance data. After a transaction and all of the transaction subcomponents have completed, a baseline is determined for the transaction performance. In some embodiments, the method of FIG. 8 is performed by agent 152 and provides more detail for step 445 of the method of FIG. 4.

First, a time series of past performance data associated with the recently completed transaction (the transaction completed at step 430) or component is accessed at step 810. The time series may be received as a first group of data in a set of groups received periodically. For example, the process of identifying anomalous transactions may be performed periodically, such as every five, ten or fifteen seconds. The time series of data may be stored by the agent and represents past performance of the transaction being analyzed. For example, the time series of past performance data may represent response times for the last 50 invocations, the invocations in the last fifteen seconds, or some other set of invocations for the particular transaction.

A selected function is fit to the times series at step 820. Step 820 may include selecting a particular function as well as fitting the selected function to the time series data. In some embodiments, the function may be pre-set or configured by a user as part of tracing session configuration. In some embodiment, fitting a function to a time series may include selecting a best fitting function from a group of functions. Fitting data functions to a time series of data may also include determining function constants and other calculations.

Several types of functions providing statistical models of an application performance data time series may be used with the present technology. Examples of statistical models suitable for use may include simple moving average, weighted moving average, single exponential smoothing, double exponential smoothing, triple double exponential smoothing, exponentially weighted moving average, Holt's linear exponential smoothing, Holt-Winters forecasting technique, and others.

For example, a moving averages statistical model takes a number of past periods, adds them together, and divides by the total number of periods. Simple moving averages statistical models are effective for a time series that is stationary in both mean and variance. A formula used in finding the moving average of order n, MA(n) for a period t+1, is $MA_{t+1}=[D_t+D_{t-1}+\ldots+D_{t-n+1}]/n$, where n is the number of observation used in the calculation. The forecast for time period t+1 is the forecast for all future time periods.

A weighted moving averages statistical function is given as weighted $MA(3)=w_1 \cdot D_t+w_2 \cdot D_{t-1}+w_3 \cdot D_{t-2}$, where the weights are any positive numbers such that w1+w2+w3=1.

A single exponential smoothing statistical model may be calculated as $F_{t+1}=\alpha D_t+(1-\alpha)F_t$, where $D_t$ is the actual value, $F_t$ is the forecasted value, $\alpha$ is the weighting factor, which ranges from 0 to 1, and t is the current time period. A single exponential smoothing statistical model calculates the smoothed series as a damping coefficient times the actual series, plus one minus the damping coefficient times the lagged value of the smoothed series. A small a provides a detectable and visible smoothing, while a large $\alpha$ provides a fast response to the recent changes in the time series but provides a smaller amount of smoothing.

An exponential smoothing over an already smoothed time series is called double-exponential smoothing. A double exponential smoothing applies the process described above to account for linear trend. The extrapolated series has a constant growth rate, equal to the growth of the smoothed series at the end of the data period. In some cases, it might be necessary to extend the series to a triple-exponential smoothing. While simple exponential smoothing requires stationary condition, the double-exponential smoothing can capture linear trends, and triple-exponential smoothing can handle almost all other time series.

An exponentially weighted moving average provides for the weight of each observed data point to drop exponentially the further back (k) in time it is. The weight of any individual is $\alpha (1-\alpha)^k$, where a is the smoothing constant. An exponentially weighted moving average with a smoothing constant $\alpha$ corresponds roughly to a simple moving average of length n, where $\alpha$ and n are related by $\alpha=2/(n+1)$ or $n=(2-\alpha)/\alpha$. Thus, an exponentially weighted moving average with a smoothing constant equal to 0.1 would correspond roughly to a 19 data point moving average. Similarly, a 40-data point simple moving average would correspond roughly to an exponentially weighted moving average with a smoothing constant equal to 0.04878.

Holt's linear exponential smoothing technique estimates a trend and current level in a time series. The trend $T_t$ at time t is the difference between the current and previous level. The updating equations express ideas similar to those for exponential smoothing. The level may expressed as $L_t=\alpha y_t+(1-\alpha)F_t$, and the trend may be expressed as $T_t=\beta(L_t-L_{t-1})+(1\beta)T_{t-1}$. Smoothing parameters $\alpha$ and $\beta$ must be positive and less than one. The forecasting for k periods into the future is $F_{n+k}=L_n+k \cdot T_n$. Given that the level and trend remain unchanged, the initial (starting) values are $T_2=y_2-y_1$, $L_2=y_2$, and $F_3=L_2+T_2$.

Returning to the method of FIG. 8, after fitting a function to the time series of data, current transaction trace data is retrieved at step 830. The current transaction trace data is the data associated with the most currently completed transaction invocation, for example the transaction which ended at step 710 in the method of FIG. 7.

Values for the performance of the transaction are dynamically predicted at step 840. The function fitted at step 820 is used to predict an expected value for the transaction performance. Predicting a value for the transaction performance involves determining a baseline using the fitted function and time data for the current performance data.

For example, let N identify the number of points in a time series used to fit a function to that time series. The expected value for the performance data, the value for data point N+1, is predicted for the function using statistical model formulas such as those described above. Thus, a predicted data point, the expected value of the next data point in the time series, is generated for the function. For example, for a moving average function based on the last three data points, if the last three data points in a time series are 0.243, 0.245 and 0.244, the predicted data point would be the average of these points, or 0.244. After predicting the next data point, the method of FIG. 8 ends at step 850.

Figure 9:
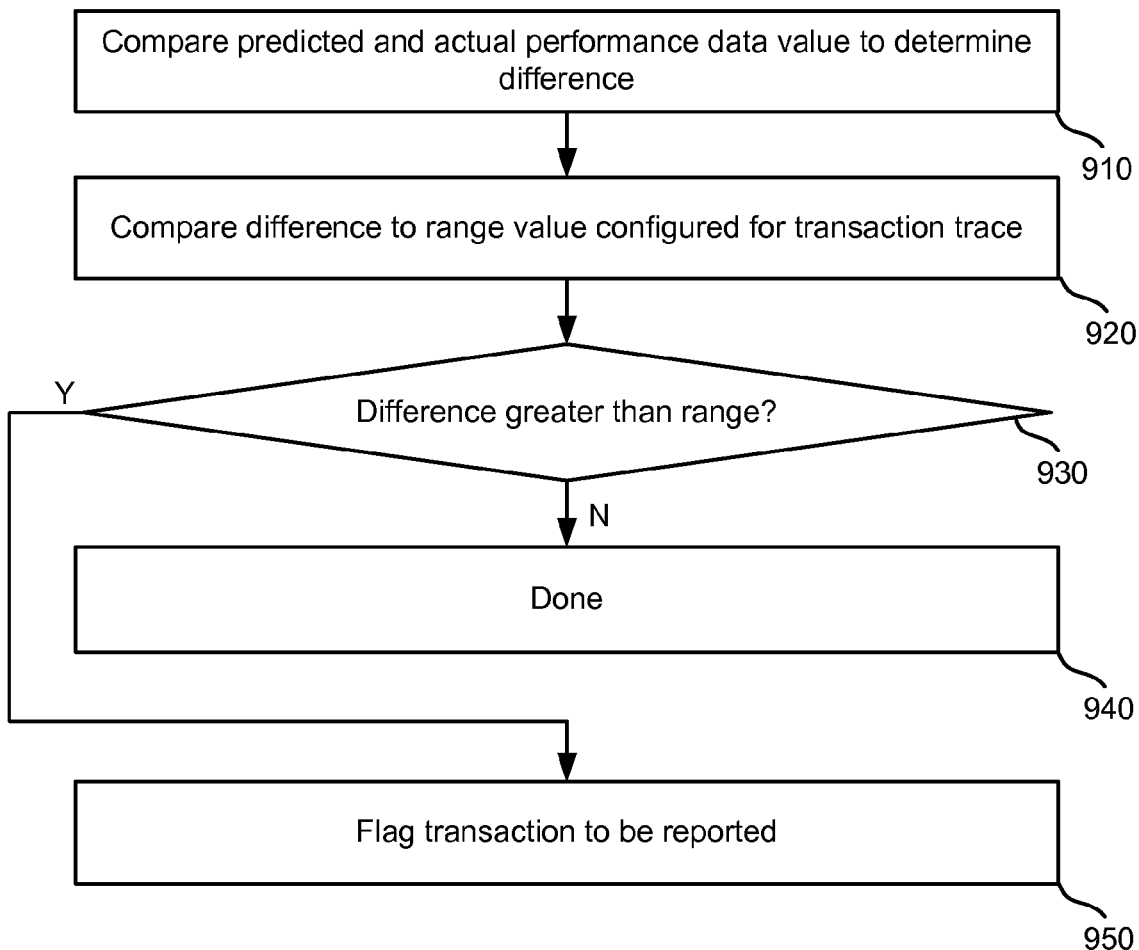
FIG. 9 illustrates a flowchart of an embodiment of a method for comparing transaction performance data.

FIG. 9 illustrates a flowchart of an embodiment of a method for comparing transaction performance data. In some embodiments, the method of FIG. 9 is performed by agent 152 and provides more detail for step 450 of the method of FIG. 4. First, the predicted and actual performance data values are compared at step 910. The actual performance data may be determined based on information provided to agent 152 by tracing code within an application. For example, tracing code may provide times stamps associated with the start and end of a transaction. From the time stamps, performance data such as the response time may be determined and used in the comparison at step 910. This is discussed above with respect to step 740 in the method of FIG. 7. The predicted performance data value is the baseline value determined at step 840 in the method of FIG. 8.

The difference between the actual performance data value and a predicted performance data value will result in a difference. Typically, the expected value and actual value will not be an exact match. The difference resulting from the comparison at step 910 is compared to a range value for the trace session at step 920. As discussed above, when a trace session is configured by a user at a workstation (or pre-set or otherwise configured), a range or sensitivity for the baseline may be configured. The range or sensitivity may specify how far an expected performance data value may differ from a baseline value for a particular transaction before the current transaction is considered an anomaly. For example, a baseline for a transaction response time may be 800 milliseconds and have a sensitivity range of plus or minus 100 milliseconds. In this example, the actual performance data may fall within the range of 700 to 900 milliseconds and not be considered an anomaly.

If the difference between the actual performance data and expected performance data value is less than the range or sensitivity parameter for the transaction, the transaction performance is acceptable and the method of FIG. 9 ends at step 940. If the difference is greater than the sensitivity, indicating that the actual performance data for the transaction did not satisfy the baseline and range of expected data, the particular transaction is flagged to be reported at step 950.

The method of FIG. 9 may be performed for each completed transaction, either when the transaction completes, periodically, or at some other event. Flagging a transaction eventually results in the particular instance of the transaction being reported to Enterprise Manager 120 by agent 152; not every invocation of the transaction is reported. Upon the detection of a reporting event, flagged transaction instances are detected, data is accessed for the flagged transactions, and the accessed data is reported. This is discussed in more detail below with respect to the method of FIG. 10.

Figure 10:
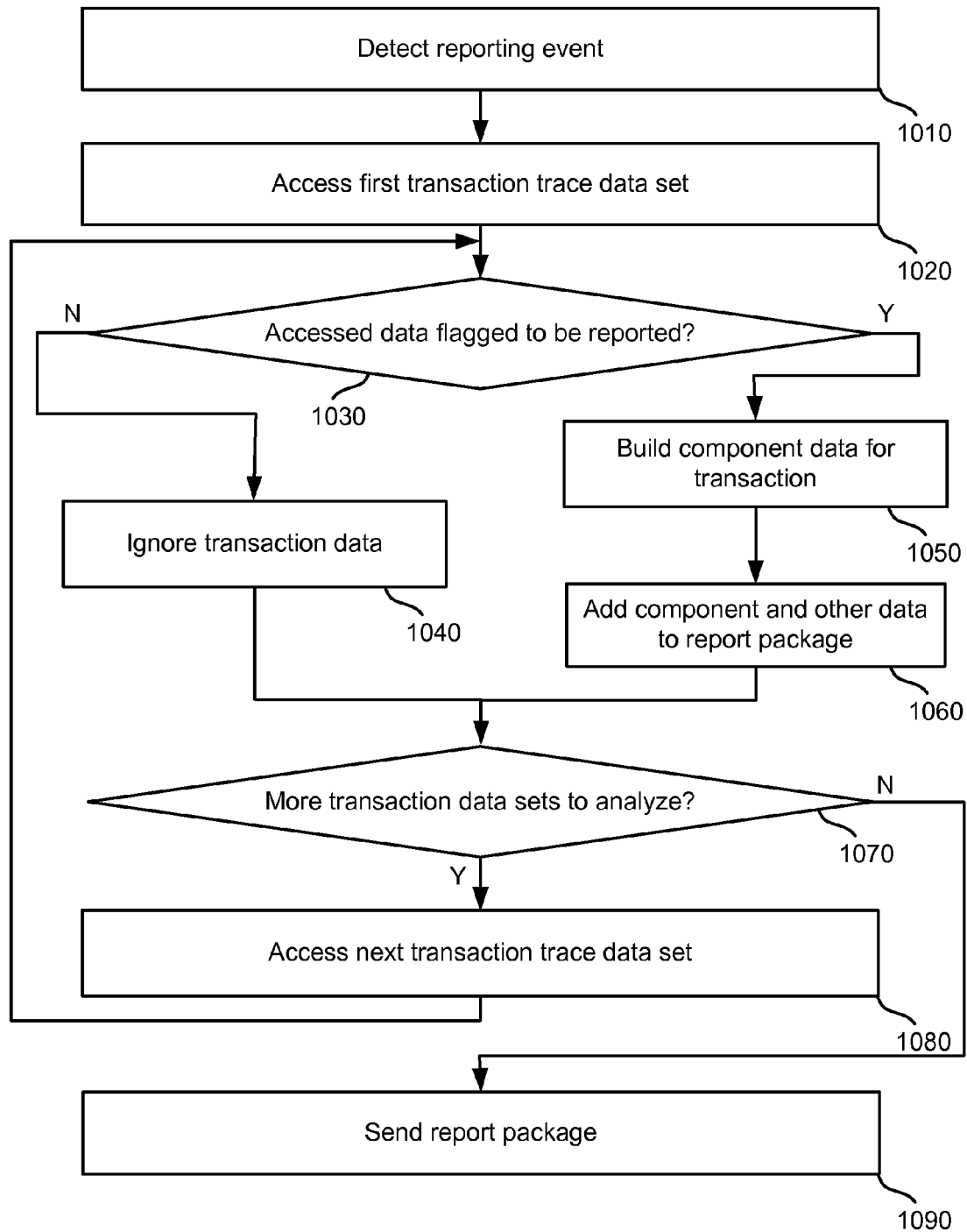
FIG. 10 illustrates a flowchart of an embodiment of a method for reporting anomalous events.

FIG. 10 illustrates a flow chart of an embodiment of a method for reporting anomaly events. In some embodiments, the method at FIG. 10 provides more detail for step 470 for the method of FIG. 4. First, a reporting event is detected at step 1010. The reporting event may be the occurrence of the expiration of a timer, a request received from enterprise manager 120, or some other event. Next, a first transaction trace data set is accessed at step 1020. In one embodiment, one set of data exists for each transaction performed since the last reporting event. Each of these data sets are analyzed to determine if they are flagged for reporting to Enterprise Manager 120.

After accessing the first transaction trace data set, a determination is made as to whether the accessed data set is flagged to be reported at step 1030. A transaction may be flagged at step 950 in the method of FIG. 9 if it is determined to be an anomaly. If the current accessed transaction is flagged to be reported, component data for the transaction is built at step 1050. Building component data for a transaction may include assembling performance, structural, relationship and other data for each component in the flagged transaction as well as other data related to the transaction as a whole. The other data may include, for example, a user ID, session ID, URL, and other information for the transaction. After building the component data for the transaction, the component and other data is added to a report package at 1060. The report package will eventually be transmitted to enterprise manager 120 or some other module which handles reporting or storing data. After adding the transaction data to the report package, the method at FIG. 10 continues to step 1070. If the currently accessed transaction data is not flagged to be reported, the transaction data is ignored at step 1040 and the method at FIG. 10 continues to step 1070. Ignored transaction data can be overwritten, flushed, or otherwise ignored. Typically, ignored transaction data is not reported to an enterprise manager 120. This reduces the quantity of data reported to an enterprise manager from the server and reduces the load on server resources.

A determination is made as to whether more transaction data sets exists to be analyzed at step 1070. If more transaction data sets are to be analyzed to determine if a corresponding transaction is flagged, the next transaction data set is accessed at step 1080 and the method at FIG. 10 returns at step 1030. If no further transaction data sets exist to be analyzed, the report package containing the flagged data sets and component data is transmitted to enterprise manager 1020 at step 1090.

Once data for flagged transactions is sent to Enterprise Manger 120, the data is reported in some manner. Reporting may include providing the user through an interface, sending an alert to a user through the interface, a mobile device such as a cell phone or pager, providing the data to a printer to be printed, storing the data at a database, or some other manner of reporting the data. One method for reporting data is discussed below with respect to FIG. 11.

Figure 11:
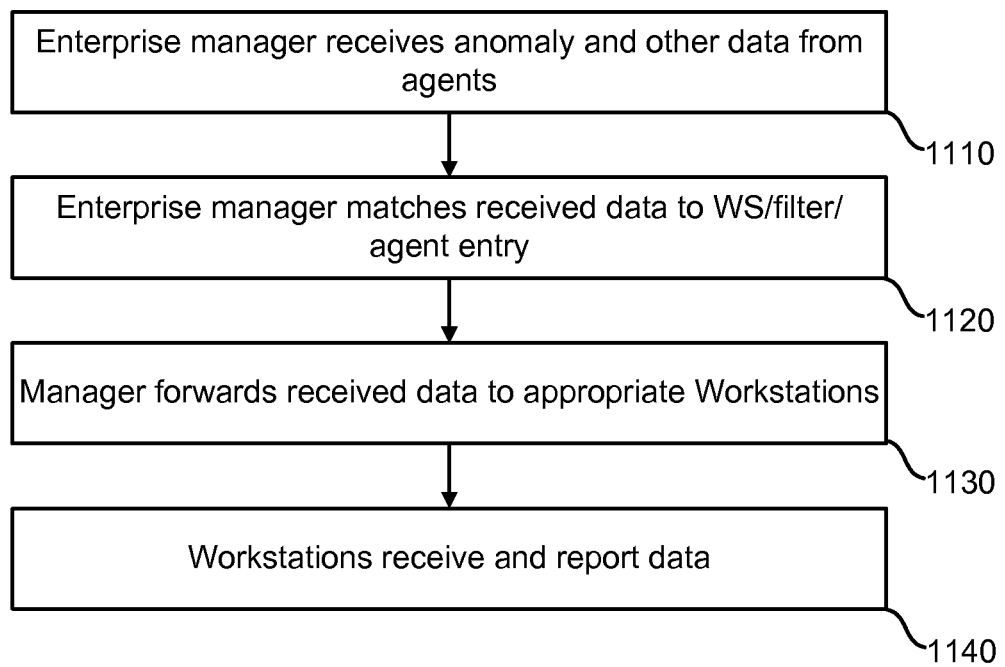
FIG. 11 illustrates a flowchart of an embodiment of a method for providing report data to a user.

FIG. 11 illustrates a flowchart of an embodiment of a method for providing report data to a user. First, Agent 152 sends data to Enterprise Manager 120 at step 1110. The data sent by Agent 1110 is the report package having transaction and component level data for each transaction flagged as an anomaly. After receiving the data, Enterprise Manager 120 matches the received data to the appropriate workstation/filter/Agent entry. In some embodiments, the appropriate entry will correspond to the workstation used to configure the trace session which detected a corresponding anomalous transaction. Thus, portions of the received data corresponding to different transaction may be reported to different workstations.

Enterprise Manager 120 forwards the data to the appropriate workstation(s) based on the matching entry at step 1130. The appropriate workstations receive and report the data at step 1140. In one embodiment, the workstation can report the data by writing information to a text file, to a relational database, or other data container. In another embodiment, a workstation can report the data by displaying the data in a GUI, or transmitting information via a pager, mobile device, printer, facsimile or some other device.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A machine implemented method for monitoring transactions, comprising:
   monitoring instances of a transaction performed at a server in response to a request;
   generating performance data for the instances of the transaction;
   dynamically determining an expected value for the performance data of a first instance of the transaction based on a trend in the performance data of other instances of the transaction;
   determining, for the first instance of the transaction, whether to report the performance data for the first instance based on a comparison of the expected value for the performance data for the first instance of the transaction and the generated performance data for the first instance of the transaction;
   reporting performance data for the first instance of the transaction when the determination is to report the performance data;
   wherein the generating performance data for the instances of the transaction comprises collecting trace data;
   wherein the dynamically determining an expected value for the performance data of a first instance of the transaction comprises estimating a time for the first instance to complete; and wherein the reporting performance data for the first instance of the transaction comprises reporting the trace data for the first instance of the transaction.

2. The machine implemented method of claim 1, wherein said dynamically determining an expected value comprises:
accessing a time series of data points of past performance data of instances of the transaction; and
dynamically determining a next value for transaction performance from the trend in time series of data points, the next value being the expected value.

3. The machine implemented method of claim 2, wherein said dynamically determining the next value comprises:
fitting a function to the time series of data points; and
predicting a value for the function using the fitted function, the value for the function being the expected value.

4. The machine implemented method of claim 3, wherein said dynamically determining an expected value is performed by code located on said server.

5. The method of claim 2, wherein the data points comprise response times for past instances of the transaction.

6. The machine implemented method of claim 1, wherein the transactions are associated with components, said reporting performance data comprising reporting component performance data for the first instance of the transaction when the determination is to report the performance data, the component performance data for the first instance of the transaction is not reported otherwise.

7. The machine implemented method of claim 1, wherein the transactions are monitored at the server by monitoring code inserted into an application.

8. The machine implemented method of claim 7, wherein said generating performance data comprises:
receiving runtime data by an agent from the monitoring code, the server comprising the agent; and
generating the performance data from the runtime data by the agent.

9. The machine implemented method of claim 1, wherein:
the reporting performance data for the first instance of the transaction when the determination is to report the performance data comprises reporting the performance data for the first instance of the transaction to an application monitoring system by the server, the performance data is not reported to the application monitoring system by the server otherwise.

10. The method of claim 9, wherein the transactions are traced by monitoring code on the server to trace data for the transactions, the trace represents execution of components of the application responsive to the respective instance of the transaction.

11. The machine implemented method of claim 1, further comprising generating an alert for the first instance of the transaction based on said comparison of the expected value for the performance data for the first instance of the transaction and the generated performance data for the first instance of the transaction.

12. The machine implemented method of claim 1, further comprising:
receiving a parameter that specifies how far the generated performance for the instances of the transaction may differ from the expected value for the performance for the instances of the transaction, the determining whether to report the performance data comprises determining whether the generated performance differs from the expected value by more than the parameter.

13. A processor readable storage hardware device having processor readable code embodied thereon for programming a processor to:

trace a plurality of instances of a transaction at a server to collect trace data, each of the plurality of instances of the transaction associated with components of an application and performed in response to a request, the trace data for a respective instance of the transaction identifies the components executed in response to a request associated with the respective instance;
determine execution times for each of the instances of the transaction based on the trace data for the respective transaction;
calculate an expected value of the execution time for a first instance of the transaction from a trend in past execution times of other instances of the transaction;
compare the determined execution time to the expected execution time for the first instance of the transaction;
determine, for the first instance of the transaction, whether to report the trace data for the first instance of the transaction based on the comparison of the determined execution time to the expected execution time for the first instance of the transaction; and
report the trace data for the first instance of the transaction in response to determining to report the trace data.

14. The processor readable storage hardware device of claim 13, wherein said processor readable code for programming the processor to determine execution times comprises:
processor readable code within an application for programming the processor to report transaction events to an agent.

15. The processor readable storage hardware device of claim 13, wherein said processor readable code for programming the processor to calculate an expected value for the execution time comprises:
processor readable code for programming the processor to access a time series of past execution times for past instances of the transaction; and
processor readable code for programming the processor to predict an expected value for the execution time for the first instance of the transaction based on a next value in the time series.

16. The processor readable storage hardware device of claim 15, wherein said processor readable code for programming the processor to predict an expected value for the execution time comprises:
processor readable code for programming the processor to fit a function to the time series of past performance data; and
processor readable code for programming the processor to calculate an expected value for the execution time using the fitted function.

17. The processor readable storage hardware device of claim 13, wherein said processor readable code for programming the processor to compare the determined execution time to the expected execution time for the first instance of the transaction comprises:
processor readable code for programming the processor to determine a difference between the determined execution time and the execution time for the first instance of the transaction; and
processor readable code for programming the processor to compare the difference for the first instance of the transaction to a sensitivity setting.

18. The processor readable storage hardware device of claim 17, wherein said processor readable code for programming the processor to report the trace data comprises:
processor readable code for programming the processor to identify transactions for which the difference is greater than the sensitivity setting; and processor readable code for programming the processor to report the trace data for the identified transactions.

19. A machine implemented method for monitoring code, comprising:
- monitoring sets of code at a server, each set of code executed in response to an instance of a request;
- collecting a transaction trace for each instance of the request;
- determining an execution time for each instance of the request based on the transaction trace;
- dynamically calculating an expected value for the execution time for each instance of the request from a trend in past execution times for other instances of the request;
- comparing the determined execution time to the expected value for each instance of the request to determine a difference for each instance of the request;
- flagging instances of the request for which the difference between the expected value for the execution time and the determined execution time is greater than a parameter that defines an anomalous instance of the request; and
- reporting the transaction trace by said server for each flagged instance of the request while ignoring the transaction trace for instances of the request that are not flagged.

20. The machine implemented method of claim 19, wherein the server executes sets of code comprised of two or more components, the reported transaction trace comprising performance data for each component.

21. The machine implemented method of claim 19, wherein said comparing comprises:
- identifying a range of execution times for each instance of the request; and
- determining if the determined execution time is contained within the identified range.

22. The machine implemented method of claim 21, wherein said reporting the transaction trace comprises:
- reporting data for the sets of code having an execution time that does not comply with the identified range of execution times.

23. A hardware apparatus for processing data, comprising:
- a first communication interface for receiving trace data;
- a second communication interface for transmitting anomaly data;
- a storage device; and
- a processor in communication with said storage device and said first and second communication interfaces, said processor programmed to:
  - receive trace data for respective instances of a transaction;
  - predict a performance value of a first instance of the transaction based on a trend in time series data of past performance of other instances of the transaction;
  - compare the predicted performance value to actual performance of the first instance of the transaction;
  - determine whether the first instance of the transaction is an anomaly based on the comparison of the predicted performance value to the actual performance of the first instance of the transaction;
  - report the trace data for the first instance of the transaction to a remote device in response to determining that the first instance of the transaction is an anomaly; and
  - not report the trace data for the first instance of the transaction to the remote device in response to determining that the first instance of the transaction is not an anomaly.

24. The apparatus of claim 23, wherein the processor is further programmed to fit a function to past performance data for instances of the transaction to predict the performance value of the first instance of the transaction.

25. The apparatus of claim 23, wherein the processor being programmed to determine whether the first instance of the transaction is an anomaly comprises the processor being programmed to determine whether the performance value of the first instance of the transaction does not comply with a range of expected values, the range of expected values centered around the predicted performance value of the first instance of the transaction.

26. The apparatus of claim 23, wherein the processor being configured to report the trace data comprises the processor being configured to assemble transaction component data for the first instance of the transaction identified as an anomaly and report the transaction component data to the remote device.

* * * * *